(12) United States Patent
Park et al.

(10) Patent No.: US 8,438,492 B2
(45) Date of Patent: May 7, 2013

(54) APPARATUS AND METHOD FOR PROVIDING USER INTERFACE SERVICE IN A MULTIMEDIA SYSTEM

(75) Inventors: Kyung-Mo Park, Seoul (KR); Jae-Yeon Song, Seoul (KR); Seo-Young Hwang, Suwon-si (KR); Kook-Heui Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 289 days.

(21) Appl. No.: 12/504,323

(22) Filed: Jul. 16, 2009

(65) Prior Publication Data
US 2010/0017372 A1 Jan. 21, 2010

(30) Foreign Application Priority Data
Jul. 16, 2008 (KR) ......................... 10-2008-0069351

(51) Int. Cl.
*G06F 3/048* (2006.01)
(52) U.S. Cl.
USPC ........... 715/763; 707/705; 715/765; 715/864; 715/866
(58) Field of Classification Search ............... 715/773, 715/700, 762, 763, 764, 765, 864, 866; 707/705
See application file for complete search history.

(56) References Cited

U.S. PATENT DOCUMENTS

| 6,738,077 | B1 | 5/2004 | Wendker et al. | |
| 7,139,983 | B2* | 11/2006 | Kelts | 715/802 |
| 2002/0109718 | A1* | 8/2002 | Mansour et al. | 345/744 |
| 2003/0160822 | A1* | 8/2003 | Belz et al. | 345/762 |
| 2005/0015395 | A1* | 1/2005 | Hirota | 707/100 |
| 2006/0085819 | A1* | 4/2006 | Bruck et al. | 725/52 |
| 2006/0158368 | A1* | 7/2006 | Walter et al. | 341/176 |
| 2006/0168526 | A1* | 7/2006 | Stirbu | 715/740 |
| 2007/0276811 | A1* | 11/2007 | Rosen | 707/3 |
| 2009/0138579 | A1* | 5/2009 | Jung | 709/221 |
| 2009/0210488 | A1* | 8/2009 | Lee | 709/203 |

FOREIGN PATENT DOCUMENTS

| KR | 1020050083432 | 8/2005 |
| KR | 1020050092514 | 9/2005 |
| WO | WO 2006/124215 | 11/2006 |

* cited by examiner

*Primary Examiner* — Marc Somers
(74) *Attorney, Agent, or Firm* — The Farrell Law Firm, P.C.

(57) ABSTRACT

An apparatus and method are provided for providing a User Interface (UI) service in a multimedia system. The method includes receiving UI data from a UI server; abstracting UI data that is structuralized on an object-by-object basis, and corresponds to an input from a UI client; creating adaptive UI data by reflecting a UI environment of a device for displaying, in the abstracted UI data; and displaying the created adaptive UI data.

10 Claims, 5 Drawing Sheets

APPARATUS AND METHOD FOR PROVIDING USER INTERFACE SERVICE IN A MULTIMEDIA SYSTEM

PRIORITY

This application claims priority under 35 U.S.C. §119(a) to a Korean Patent Application filed in the Korean Intellectual Property Office on Jul. 16, 2008 and assigned Serial No. 10-2008-0069351, the entire disclosure of which is incorporated herein by reference.

BACKGROUND OF THE INVENTION

1. Field of the Invention

The present invention relates generally to an apparatus and method for providing an adaptive user interface service to support various types of communication devices.

2. Description of the Related Art

With the rapid evolution of network and multimedia technologies, many different types of multimedia devices have recently been developed, and convergence between these multimedia devices is rapidly progressing.

Currently, it is very common that multimedia devices equipped with various output devices, such as digital TVs, home theaters, computer devices, audio/video devices, etc., transmit and receive multimedia data to/from different types of input devices over a network environment, and an interaction between these multimedia devices provides converged multimedia services.

Conventionally, remote control of a media device from a different physical space, e.g., the control of a TV in a home from a computer device at an office, is performed by transmitting and receiving remote User Interfaces (UIs). For the remote control, a UI server provides UI data to a UI client, and the UI client controls the UI server based on the provided UI data. As another example, remote access or control of a Personal Computer (PC) is a service similar to the above-stated user interface service.

SUMMARY OF THE INVENTION

The present invention is designed to provide at least the advantages described below. Accordingly, an aspect of the present invention provides an apparatus and method for creating User Interface (UI) data suitable for a UI environment.

Another aspect of the present invention provides a UI service apparatus and method for selectively abstracting and displaying UI data suitable to its own UI environment.

Another aspect of the present invention provides a UI apparatus and method for adaptively processing UI data provided from a remote UI server to a UI client to control a multimedia device.

Another aspect of the present invention provides a UI apparatus and method for newly configuring UI data provided to a UI client according to its own UI environment, to control a multimedia device.

Another aspect of the present invention provides a UI apparatus and method for configuring new UI data by aggregating UI data from another UI client with its own UI data.

In accordance with an aspect of the present invention, a method is provided for providing a User Interface (UI) service in a multimedia system. The method includes receiving UI data from a UI server; abstracting UI data that is structuralized on an object-by-object basis and corresponds to an input from a UI client; creating adaptive UI data by reflecting a UI environment of a device for displaying, in the abstracted UI data; and displaying the created adaptive UI data on a screen of the device.

In accordance with another aspect of the present invention, an apparatus is provided for providing a UI service in a multimedia system. The apparatus includes a UI server for providing UI data; and a display device for abstracting UI data that is structuralized on an object-by-object basis and corresponds to an input from a UI client, creating adaptive UI data by reflecting a UI environment of the device for displaying, in the abstracted UI data, and displaying the created adaptive UI data on a screen.

In accordance with another aspect of the present invention, a UI apparatus is provided. The apparatus includes at least one widget for managing UI data received from a network server or a UI server connected to an Internet Protocol (IP) network, on an object-by-object basis; and a widget manager for controlling to select and execute the at least one widget on an object-by-object basis taking into account a functionality of a UI client that receives a key input from a user.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Figure 1:
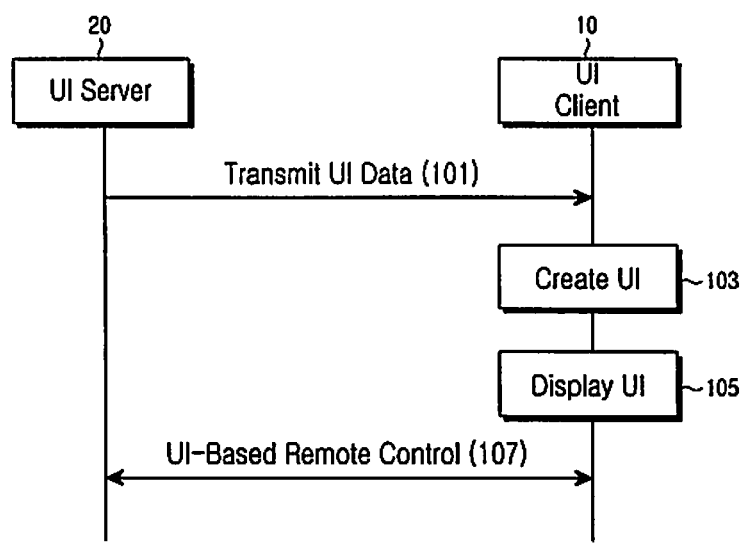
FIG. 1 is a flow diagram illustrating a basic concept of a UI service to which the present invention is applicable.

The matters defined in the description such as a detailed construction and elements are provided to assist in a comprehensive understanding of certain embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides a UI service apparatus and method supporting adaptive UI data, and in particular, to a UI apparatus and method for receiving UI data used in a UI client for controlling various multimedia devices, from a UI server or a multimedia device in an external network connected to an Internet Protocol (IP) network, or a home server in a home network to which multimedia devices is connected, and newly configuring the received UI data to be suitable to a UI environment.

In accordance with an embodiment of the present invention, a UI system includes a UI apparatus for receiving and discarding UI data provided from a UI server, a multimedia device, or a home server according to a user's request. The UI apparatus performs various controls related to creation of new UI data by searching for specific UI data and aggregating a plurality of the specific UI data.

A UI client provided in the UI apparatus includes a remote controller with a keypad, and/or an input device such as a touch screen and a keypad, for controlling an operation of the multimedia device, and can be mounted in various terminals that communicate with external devices, in the form of a program or a chip. In the present application, the UI client can be construed as an equivalent of the UI apparatus, in a broad meaning.

A User Interface (UI) is a set of visual and/or acoustic elements used to deliver information for controlling a multimedia device to a user, and UI data is data constituting the UI. With use of the UI, animations, vector graphics and multiple visual/acoustic elements can be provided. In addition, a UI event refers to interactions between a UI client and a user, such as a touch on a touch screen, a button input in a keypad, or a key input through a remote controller, which can be perceived in the UI client.

A widget includes UI elements such as windows, text boxes, weather elements, and virtual albums, which are displayed through a multimedia device or a UI apparatus. The widget, which is also commonly referred to as a "gadget," can be situated in a position selected by the user on a display screen of the multimedia device or the UI apparatus.

In accordance with an embodiment of the present invention, a method of searching for, selecting and aggregating UI data by a UI client can be roughly divided into the following two methods.

I. A first method includes checking initial UI data provided from a UI server to a multimedia device, and then creating new UI data by searching for other UI data, which is previously provided in the multimedia device and corresponds with a UI environment of the multimedia device, or by aggregating the UI data searched through the UI server with UI data provided in the multimedia device.

II. A second method includes stratifying UI data provided by the UI server based on various UI environments, and dividing the stratified data into elements of a widget, a basic module, and an extended module for fast adaptation, thereby reducing the complexities of procedures, calculations, and messages required during search and reception of UI data.

It is to be noted herein that the UI environment includes at least one of a type of a UI apparatus equipped with a UI client, such as a terminal with a remote control, a keypad, and/or a touch screen, and user-specific information such as a UI use pattern/history, an age, a sex, a job, and a preference of a user.

FIG. 1 illustrates a basic concept of a UI service method according to an embodiment of the present invention.

Referring to FIG. 1, a UI client 10 is a communication device for displaying and utilizing a UI by receiving UI data from a remote UI server 20. The UI data can be provided from the UI server 20 to the UI client 10 by way of a multimedia device (not shown).

In step 101, the UI server 20 transmits UI data to the UI client 10. The UI server 20 can also advertise and broadcast the UI data, and/or remotely update the UI data provided to the UI client 10. Here, the UI server 20 may use the general downloading scheme or streaming scheme during the transmission of UI data.

The UI data the UI server 20 provides to the UI client 10 can be encoded in a format of multimedia data according to, for example, the Moving Picture Experts Group (MPEG) standard. The UI data can also be provided after being encoded in a format of multimedia data using the well-known MPEG scene description method. In this case, the UI data may include information about dynamic UI creation. The MPEG standard is an international standard for a method of compressively encoding video and audio, and there are various versions of the standard, including but not limited to MPEG-1, MPEG-2, MPEG-4, and MPEG-7. The UI server 20 encodes the UI data using, for example, the MPEG standard, before transmission.

Recently, most multimedia devices include an MPEG decoder capable of replaying compressed videos. Therefore, when the UI data is encoded based on the MPEG standard before transmission, most of the multimedia devices can represent the UI without a separate browser for UI representation.

For these environments, ISO/IEC 14496-11 and ISO/IEC 14496-20 technologies are defined in the MPEG standard to provide scene representation-related technologies. ISO/IEC 14496-11 includes an MPEG-4 Binary Format for Scene (BIFS) technology, and ISO/IEC 14496-20 includes a Lightweight Applications Scene Representation (LASeR) technology for mobile terminals. While BIFS is a scene description standard for all multimedia contents, LASeR is a scene description standard for multimedia terminals, which are small in size of their display and also in network bandwidth, like mobile phones. LASeR includes a multimedia content format that is prepared to enable mobile phones can receive rich multimedia services.

BIFS or LASeR is used for an object-based system, and can encode UI data using an object-based image coding scheme. Moreover, BIFS or LASeR includes information about a scene description method capable of representing temporal/spatial arrangements of objects contained in an image. Therefore, by regarding objects in UI data as image objects encoded by BIFS or LASeR, it is possible to describe temporal/spatial arrangements of UI objects by encoding them using BIFS or LASeR scene description. The UI server 20 can encode information about dynamic UI creation as well, in encoding the UI data using the MPEG scene description method.

Herein, the term "object of UI data" refers to the unit of a UI that calls a given function based on a specific UI event that happened by an interaction between a UI client and a user, such as a key input. Therefore, the UI client can represent temporal/spatial arrangements of objects in UI data, such as buttons and menus, using BIFS or LASeR.

For example, when an MPEG stream containing an image regarding a UI is created by encoding UI data using a video codec such as BIFS or LASeR, the UI client 10 can display the UI by simply receiving the MPEG stream containing an image about a UI encoded by BIFS or LASeR, and decoding and replaying it with an MPEG decoder. Because the UI can be displayed by simply replaying the MPEG-steam, various devices with an MPEG decoder, like the multimedia device, can display the UI provided by the UI server 20. The UI client 10 can also display the UI provided by the UI server 20 as described above, if it has an MPEG decoder.

Referring back to FIG. 1, when a UI is formed by representing object-by-object arrangements using an object-based scene description language such as BIFS or LASeR, the UI client 10, which has received the UI data, can dynamically create and display a new UI given in consideration of an environment of the UI apparatus by selecting and rearranging objects in steps 103 and 105. In step 107, various UI-based remote controls are made between the UI client 10 and the UI server 20. Here, the control includes at least one of various controls related to use of multimedia content, such as searching for various information about the ongoing content and selecting/purchasing the searched content, and control on an operation of a multimedia device (not illustrated in FIG. 1) intermediating between the UI server 20 and the UI client 10.

Figure 2:
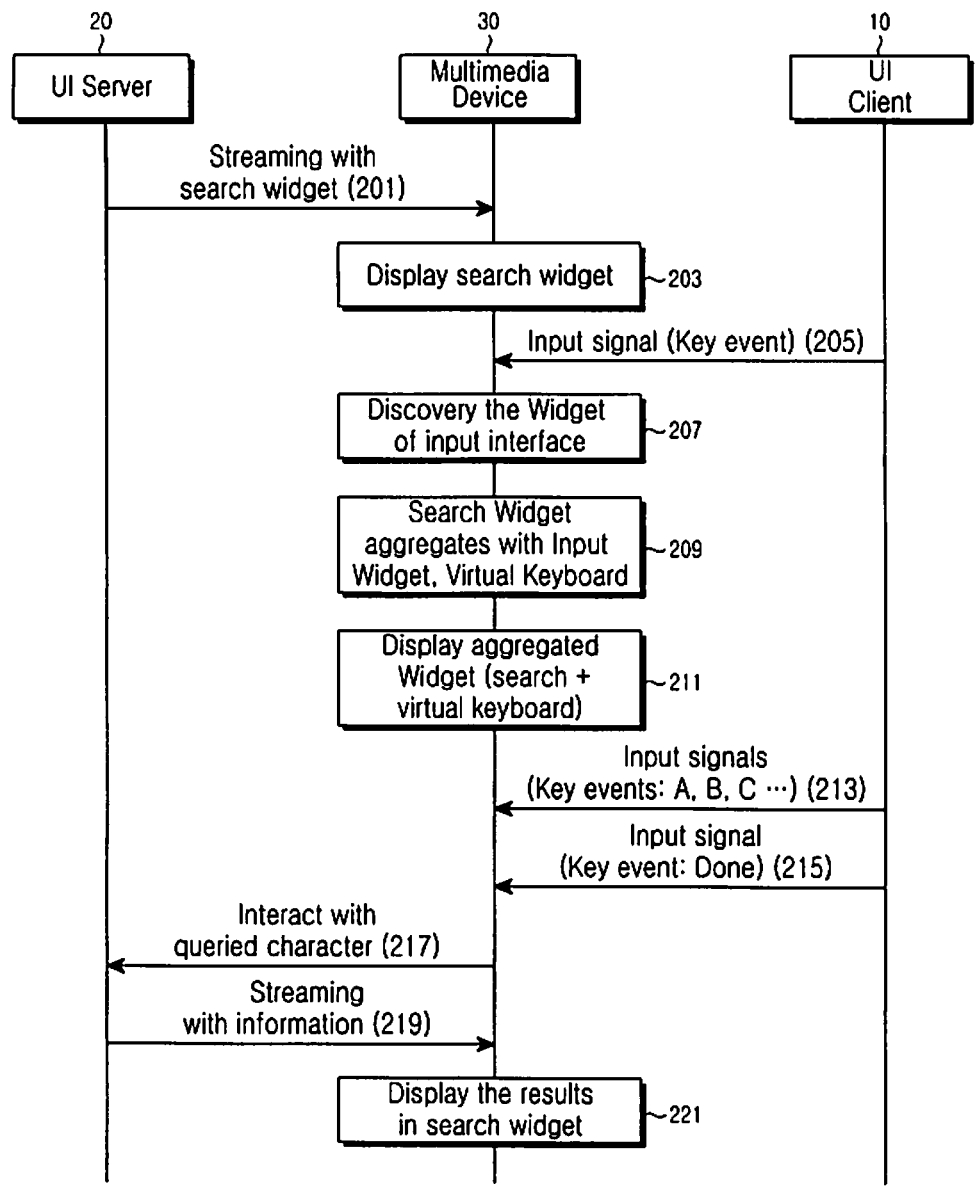
FIG. 2 is a flow diagram illustrating a UI service model according to an embodiment of the present invention.

FIG. 2 illustrates a UI service model according to an embodiment of the present invention. In FIG. 2, a new UI environment is created by aggregating UI data provided from a UI server 20 with UI data stored in a UI client 10 or a multimedia device 30. For a better understanding of this embodiment of the present invention, in the following description, a new search UI environment is created by abstracting and aggregating specific UI data in association with, for example, a search widget.

In the example illustrated in FIG. 2, the UI client 10 is assumed to be a remote control with a keypad, but the UI client 10 could also be a communication device or terminal having a display means for displaying UIs, and an input means such as a keypad and a touch screen. Also, a server of a search site capable of searching for and transmitting at least one widget for a UI service in an IP network or a separate UI-dedicated server for providing a UI service can be used as the UI server 20.

Referring to FIG. 2, in step 201, the UI server 20 transmits UI data associated with a search widget to the multimedia device 30 using a streaming scheme or a downloading scheme. The UI data transmitted in step 201 may include a widget for UI representation, and can be transmitted to the multimedia device 30 using a predetermined scheme even though there is no transmission request from the multimedia device 30.

In step 203, the multimedia device 30 displays at least one search UI data received from the UI server 20. The display operation can be performed upon a content execution request for the UI data or during execution of the content.

In step 205, a user having seen the UI data, i.e., a widget, being displayed may select a pertinent search widget as it is, using the UI client 10. However, if the displayed widget is not a desired search widget, the user may enter a key for searching for other widget or aggregating different UI data. If a key event is transmitted from the UI client 10 to the multimedia device 30 in step 205, the multimedia device 30 can collect and display widgets associated with the UI data provided therein in steps 207 to 211.

More specifically, the multimedia device 30, which has received the key event from the UI client 10 in step 205, discovers UI data that is a widget related to an input interface, from among the UI data of the received search widget and/or its own UI data in step 207. That is, the multimedia device 30 checks if a key event from the UI client 10, for representing a search widget, i.e., an input interface for processing an input signal exists therein as its own UI environment.

In step 209, the multimedia device 30 creates a search widget provided by aggregating an input widget for processing an input key event with a virtual keyboard for creating a key value corresponding to the input key. That is, the multimedia device 30 forms a search widget by abstracting and aggregating objects of the discovered input interface and the virtual keyboard, which is its own key input interface.

In step 211, the multimedia device 30 displays the aggregated widget. For example, the multimedia device 30 displays an aggregated search widget that includes a search widget for performing a search function in response to an input signal from the UI client 10 and a virtual keyboard for processing the input signal.

In step 213, upon receipt of a key event from the UI client 10 through a key input by the user, the multimedia device 30 applies the key event to the search widget.

More specifically, in steps 213 to 221, if there is a key input made by the user (the UI client 10), pertinent control operations, such as information search and content selection/purchase/execution, are performed among the UI client 10, the UI server 20, and the multimedia device 30. In step 213, the multimedia device 30 receives a signal corresponding to a key input from the UI client 10. The multimedia device 30 then checks a key value corresponding to the received signal, i.e., information requested from the UI client 10, using its virtual keyboard. In step 215, the multimedia device 30 receives a signal indicating that the entry of key events has been completed from the UI client 10.

In step 217, an interaction for handling the requested key event is made between the multimedia device 30 and the UI server 20. That is, the multimedia device 30 requests the UI server 20 to search for information corresponding to the input signal. Then the UI server 20 makes the search based on the multimedia device 30 in response to the key input from the UI client 10.

In step 219, the multimedia device 30 receives the searched UI data corresponding to the key event from the UI server 20. The UI data can be transmitted to the multimedia device 30 using a predetermined scheme, for example, the streaming scheme.

In step 221, the multimedia device 30 displays the widget search result. That is, the multimedia device 30 displays the UI data that has completely been searched in response to the key event from the UI client 10.

Figure 3:
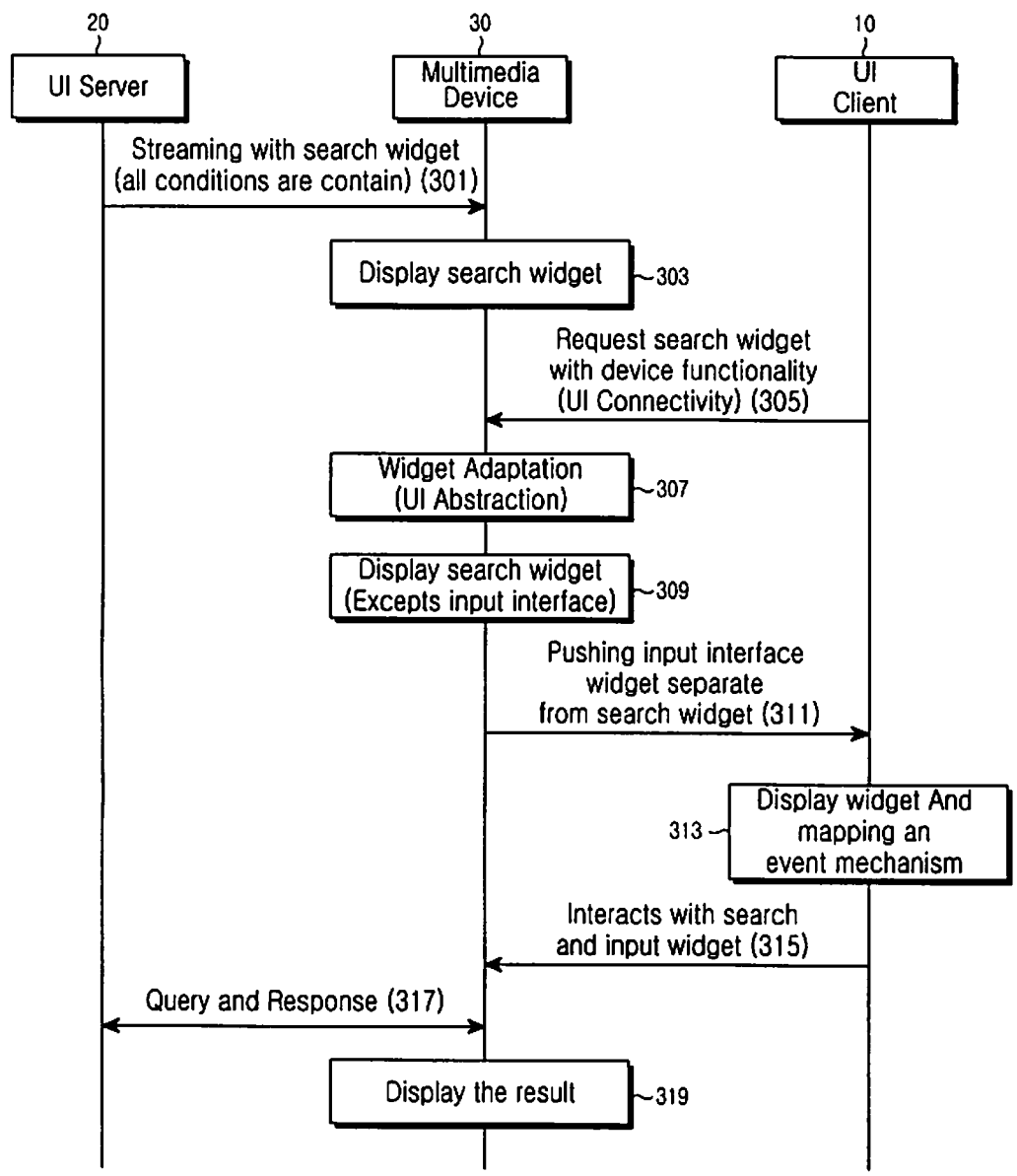
FIG. 3 is a flow diagram illustrating a UI service model according to an embodiment of the present invention.

FIG. 3 illustrates a UI service model according to another embodiment of the present invention.

In FIG. 3, a new UI environment is created by aggregating UI data that the multimedia device 30 received from the UI server 20, with input/output-related UI data that the UI client 10 provided in consideration of its UI environment. For convenience, in the following description of the present invention, it is assumed that a new search UI environment is created by abstracting and aggregating specific UI data in association with, for example, a search widget.

In FIG. 3, the UI client 10 is assumed to be a communication device or terminal having a touch screen, a keypad, and a display. The multimedia device 30, which is connected to, for example, a home network, can transmit/receive and display UI data in connection with a home server that manages the home network, or can also operate without connection with the home server. For convenience, in the following description, it is assumed that the multimedia device 20 is not in connection with the home server. The UI server 20 in FIG. 3 can be the same as the server used in FIG. 2.

Referring to FIG. 3, in step 301, the UI server 20 transmits UI data related to a search widget to the multimedia device 30 using a streaming scheme or a downloading scheme. The UI data that the multimedia device 30 received from the UI server 20 in step 301, may include all conditions for a search widget. In addition, the UI data may include at least one UI representation widget for representing a search widget, and can be transmitted to the multimedia device 30 using a predetermined scheme even though there is no transmission request from the multimedia device 30.

In step 303, the multimedia device 30 displays at least one search UI data received from the UI server 20. The display operation can be performed upon a content execution request for the UI data or during execution of the content.

In step 305, a user who having seen the UI data, i.e., a widget, being displayed may select the pertinent widget as it is. However, if the displayed widget is not a desired widget, the user may enter a key for searching for other widget or aggregating different UI data.

In step 305, the UI client 10 sends a request for a search widget given in consideration of device functionality (or UI connectivity) to the multimedia device 30. That is, upon receipt of a request for a search widget based on a UI environment (Request search widget with device functionality (UI connectivity)) from a device equipped with the UI client 10, the multimedia device 30 checks UI connectivity with the UI client 10, i.e., UI functionality of a device equipped with the UI client 10, in step 307.

For example, in step 307, the multimedia device 30 can check a type of the terminal whether the UI client 10 is a terminal with a keypad or a terminal with a touch screen. The multimedia device 30 can also check a type of a UI apparatus equipped with the UI client 10, or user-specific information such as a UI use pattern/history, an age, a sex, a job, and a preference of a UI client's user.

Therefore, in step 307, the multimedia device 30 abstracts UI data satisfying UI connectivity with the UI client 10, from among at least one UI data representing a search widget, which is received from the UI server 20. That is, the multimedia device 30 performs a widget application given based on UI conductivity with the UI client 10. Here, the multimedia device 30 can dynamically create and display a new UI environment by selectively abstracting and rearranging objects of the UI data given in consideration of UI connectivity.

Specific UI data satisfying UI connectivity includes at least one UI data object abstracted by considering a characteristic of a UI client, from among UI data related to a search widget that the multimedia device 30 received from the UI server 20, UI data that the multimedia 30 has, and UI data that the multimedia device 30 created by aggregating the UI data received from the UI server 20 as occasion demands, with the UI data the multimedia device 30 has.

In step 309, the multimedia device 30 displays a proper search widget that is abstracted as it satisfies UI connectivity with the UI client 10. When displaying the proper widget, the multimedia device 30 may consider performance and/or a bind event of a terminal equipped with the UI client 10. Here, the bind event includes a call related to all operations (by keyboard and pointer) that can be performed for a widget.

In step 311, the multimedia device 30 separates an input interface widget from the created search widget and provides it to the UI client 10. That is, the UI client 10 is adapted to realize the search widget by receiving the input interface widget from the multimedia device 30 and interacting with the multimedia device 30.

In step 313, the UI client 10 displays a search window for a search widget on its screen by mapping the received input interface widget to its event technology for processing a key input from the user. The search window can also be displayed on the multimedia device 30 in the same way.

In steps 313 to 319, if there is a key input by the user, control operations, such as information search and content selection/purchase/execution, are performed among the UI client 10, the UI server 20, and the multimedia device 30.

More specifically, an interaction with search and input widgets is performed between the UI client 10 and the multimedia device 30 in step 315. A user key input is reflected in the displayed search widget using a keypad or a touch screen provided in the UI client 10, and the key input-reflected search widget screen is displayed on the displayed search widget of the multimedia device 30.

In step 317, the multimedia device 30 requests the UI server 20 to search for information corresponding to an input key, and receives searched information as a response from the UI server 20. That is, a search widget is performed between the multimedia device 30 and the UI server 20 in response to a search input from the UI client 10.

In step 319, the multimedia device 30 displays the search UI data received from the UI server 20. Here, the UI data can be transmitted to the multimedia device 30 using a predetermined scheme, for example, the streaming scheme.

Figure 4:
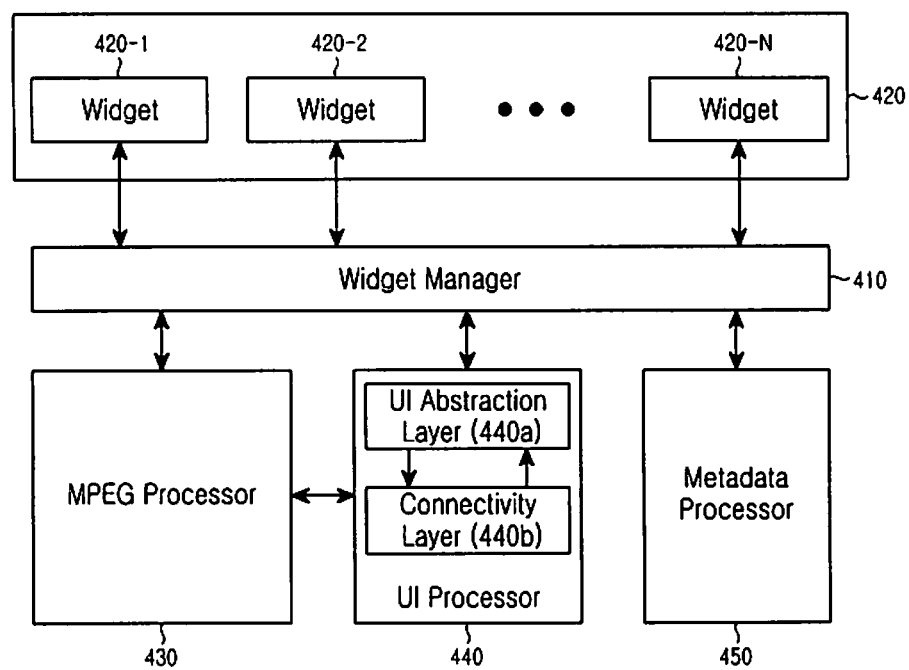
FIG. 4 is a block diagram of a UI apparatus according to an embodiment of the present invention.

FIG. 4 is a block diagram illustrating a UI apparatus according to an embodiment of the present invention.

Referring to FIG. 4, a UI apparatus includes a widget manager 410, at least one widget 420 (one of 420-1, ..., 420-N), an MPEG processor 430, a UI processor 440, and a metadata processor 450.

The UI apparatus, which is an execution device for collecting at least one UI data from a UI server, further includes a protocol module for executing a related widget, searching for the UI server, and communicating with the UI server using the widget manager 410.

The widget manager 410, which is a constituent element for controlling execution of the at least one widget (one of 420, 420-1, ..., 420-N) in a continuous manner, controls the temporal/spatial interactive creation and execution of the widget 420, and also aggregation of UI data. The widget manager 410 can execute a plurality of widgets. The widget 420 is defined in the form of an object. Therefore, the widget manager 410 can support or display a specific widget by calling and executing at least one object.

For example, in FIG. 4, the widget manager 410 controls to select and execute a search widget. Further, the widget manager 410 controls whether to selectively abstract or execute a widget for an input interface based on UI connectivity of a communication device to be equipped with a UI apparatus. That is, the widget manager 410 controls to selectively execute a widget taking into account a UI environment and a characteristic of a user of a communication device equipped with a UI client.

The MPEG processor 430 compresses (or decompresses) and encodes (or decodes) UI data according to the MPEG standard. In accordance with an embodiment of the present invention, the MPEG processor 430 decodes received UI data, which was encoded according to the MPEG standard, using the same encoding scheme, and creates a widget screen by arranging the decoded video, audio, and/or moving images in a temporal/spatial manner. The MPEG processor 430 can be optionally provided in a virtual keyboard such as a remote control, when there is no need to display a widget on a communication device equipped with a UI apparatus.

The UI processor 440 includes a UI abstraction layer 440a for managing sources of UI data, binding events, and delivering relevant UI data of a widget, which is selected and abstracted according to the search result of UI data, to the widget manager 410. Further, the UI processor 440 includes a UI connectivity layer 440b for checking UI connectivity used for searching for UI data.

The UI connectivity layer 440b provides UI connectivity so that the UI abstraction layer 440a may abstract the widget 420 given by considering UI functionality. That is, the UI connectivity layer 440b enables the UI abstraction layer 440a to abstract at least one UI data object given in consideration of UI functionality from among the widget 420 using the widget manager 410, by checking the UI functionality of a communication device that will process a UI environment, i.e., UI data, of the communication device that generated a key event. Therefore, the widget manager 410 dynamically creates and represents a new UI by selecting and rearranging UI data objects abstracted by the UI abstraction layer 440a.

The metadata processor 450, which is for processing structuralized UI data, manages and processes the object-based structuralized widget 420. In addition, the metadata processor 450 provides the user with UI data obtained by processing the event generated by the user.

Figure 5:
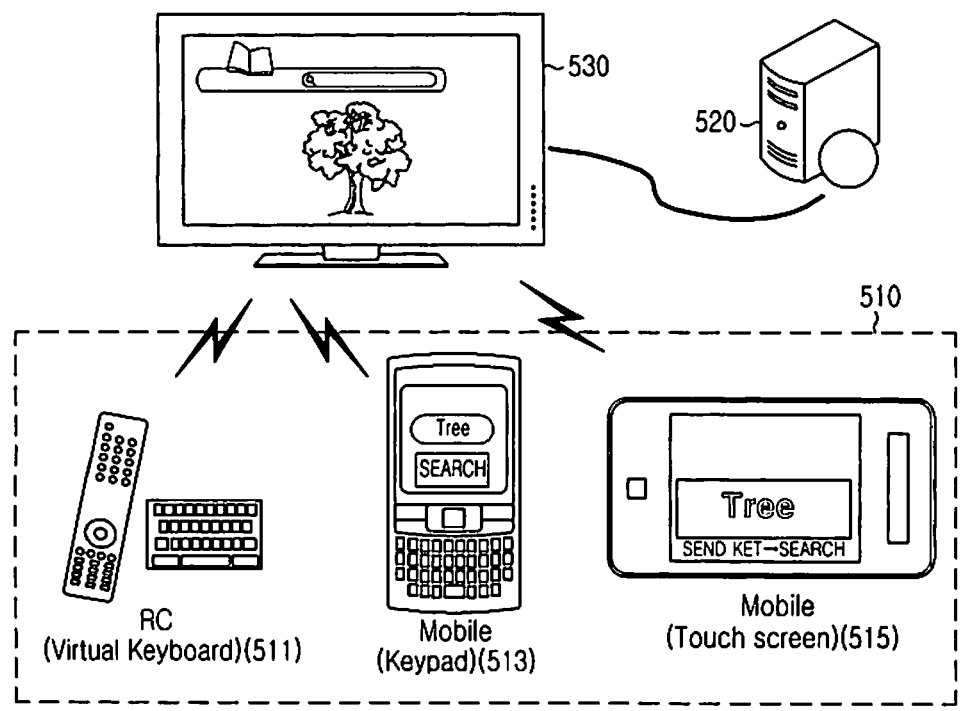
FIG. 5 is a diagram illustrating an example of a UI service system including a UI apparatus, a UI server and a multimedia device according to an embodiment of the present invention.

FIG. 5 illustrates an example of a UI service system including a UI apparatus, a UI server, and a multimedia device according to an embodiment of the present invention.

Referring to FIG. 5, the UI service system includes at least one UI apparatus 510 equipped with a UI client, a UI server 520, and a multimedia device 530. For example, the UI apparatus 510 can be a remote control (or virtual keyboard) 511, a mobile terminal including a keypad 513, or a mobile terminal including a touch screen 515. An operation of the UI service system in FIG. 5 is adaptively performed in accordance with the method of FIG. 2 or FIG. 3.

In accordance with an embodiment of the present invention, the UI apparatus 510, the UI server 520, and the multimedia device 530 are able to determine parts related to an input/output interface in each UI data through marks using at least one widget defined in the form of an object in order to easily recognize/separate/aggregate the parts, and are also be able to maintain conditions in the UI data by changing the data. In this manner, the UI client 510 can appropriately extend and aggregate the widgets the UI server 520 provides, using a plurality of input/output devices.

For example, the multimedia device 530 displays at least one search UI data received from the UI server 520. The multimedia device 503 can selectively display specific UI data according to a key input from a remote controller 511, which is its own virtual keyboard.

In order to represent a search widget, a UI client 510 that checked a search window being displayed through the multimedia device 530, reflects and displays a user key input on the displayed search window by using a keypad or a touch screen according to the user key input.

A search widget is performed between the UI client 510 and the UI server 520 through the multimedia device 530 according to a search input from the UI client 510, and the search result is displayed through the multimedia device 530.

As is apparent from the foregoing description, according to embodiments of the present invention, a device supporting a UI service can receive UI data that is based on a characteristic of its apparatus (e.g., a communication apparatus equipped with a UI client) from a remote UI server, and create and display the UI data by adaptively changing the received UI data to be suitable to the device itself through selection and aggregation.

As a result, the above-described embodiments of the present invention can provide a multimodal widget function, and provide a UI environment familiar to the user by using the multimodal widget. In addition, the embodiments of the present invention can increase user satisfaction as a device supporting a UI service can create and represent UI data appropriate thereto, taking into account its own environment (a type of an input device, a version of an input device, an input interface, etc.) and characteristic.

Embodiments of the present invention can also be embodied as computer-readable codes on a computer-readable recording medium. The computer-readable recording medium is any data storage device that can store data that can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the present invention has been shown and described with reference to a certain embodiments thereof, it will be understood by those skilled in the art that various changes in form and details may be made therein without departing from the spirit and scope of the present invention as defined by the appended claims and their equivalents.

What is claimed is:

1. A method for providing a User Interface (UI) service in a multimedia system including a multimedia device, a UI server, and a UI client device, the method comprising:

receiving, by the multimedia device, at least one UI data for representing a widget from the UI server;

displaying, by the multimedia device, the received at least one UI data on a screen of the multimedia device;

receiving, by the multimedia device, a request for a new widget given based on a functionality of the terminal from the UI client device;

adaptively creating, by the multimedia device, the new widget by abstracting at least one UI data object in consideration of the functionality of the terminal, from among the received at least one UI data or other UI data stored by the multimedia device;

displaying a proper widget on the screen of the multimedia device;

separating, by the multimedia device, an input interface from the created widget; and providing, from the multimedia device to the UI client device, the separated input interface widget.

2. The method of claim 1, further comprising:

receiving, by the multimedia device, a search input through the input interface widget from the UI client device;

performing, by the multimedia device, a search with the UI server in response to the received search input; and displaying, by the multimedia device, a result of the search on the screen of the multimedia device.

3. The method of claim 2, wherein receiving the search input includes receiving, from the UI client device, a search request entered through a screen of the UI client device through an input widget created by the UI client device by mapping the input interface widget provided from the multimedia device to an event technique and displayed on the screen of the UI client device.

4. An apparatus for providing a User Interface (UI) service in a multimedia system, comprising:

a UI server for providing UI data;

a UI client device; and a multimedia device for receiving at least one UI data for representing a widget from the UI server, displaying the received at least one UI data, receiving a request for a widget based on a functionality of the UI client device according to a key input made by a user on the UI client device, adaptively creating a widget by abstracting at least one UI data object in consideration of the functionality of the terminal, from among the received at least one UI data or other UI data stored by the multimedia device, displaying a proper widget, separating an input interface widget from the created widget, and providing the separated input interface widget to the UI client device.

5. The apparatus of claim 4, wherein the multimedia device receives a search input from the UI client device through the input interface widget, performs a search with the UI server in response to the received search input, and displays a result of the search.

6. The apparatus of claim 5, wherein the UI client creates an input widget by mapping the input interface widget of the widget provided from the multimedia device to an event technique provided in the UI client device, displays the created input widget, and providing, to the multimedia device, the search input including a search request entered through a screen of the UI client device.

7. A method for providing a User Interface (UI) service in a multimedia system including a multimedia device, a UI server, and a UI client device, the method comprising:
   receiving, by the multimedia device, at least one UI data for representing a widget from the UI server;
   displaying, by the multimedia device, the received at least one UI data on a screen of the multimedia device;
   detecting, by the multimedia device, if an input signal indicating a search widget selected by the UI client device from among the search widget and other search widgets is received from the UI client device, UI data related to an input interface from among the at least one UI data received by the multimedia device;
   discovering, by the multimedia device, an object-based input interface widget using the detected UI data;
   creating an aggregated search widget by aggregating the discovered input interface widget with the selected search widget;
   displaying, by the multimedia device, the created aggregated search widget on the screen of the multimedia device;
   performing, by the multimedia device, a search with the UI server in response to a search input from the UI client device while the created aggregated search widget is displayed; and
   displaying, by the multimedia device, a result of the performed search on the screen of the multimedia device.

8. The method of claim 7, wherein the input interface provided in the multimedia device includes a virtual keyboard, and the virtual keyboard includes a remote control.

9. An apparatus for providing a User Interface (UI) service in a multimedia system, comprising:
   a UI server for providing UI data;
   a UI client device; and
   a multimedia device for receiving at least one UI data representing a widget from the UI server, displaying the received at least one UI data, detecting UI data related to an input interface from among at least one UI data stored by the multimedia device if an input signal indicating a search widget is selected by the UI client device from among the search widgets and other search widgets is received, discovering an object-based input interface widget using the detected UI data, creating an aggregated search widget by aggregating the discovered input interface widget with UI data corresponding to the selected search widget, displaying the created aggregated search widget, performing a search with the UI server in response to the search input from the UI client device while the created aggregated search widget is displayed, and displaying a result of the performed search.

10. The apparatus of claim 9, wherein the input interface includes a virtual keyboard,
   and wherein the UI client device includes a remote control for providing input corresponding to the virtual keyboard.

\* \* \* \* \*